(12) United States Patent
Pichler

(10) Patent No.: US 7,449,109 B2
(45) Date of Patent: Nov. 11, 2008

(54) DEVICE FOR SEPARATING WATER AND FILTERING IMPURITIES OUT OF FUEL

(75) Inventor: Helmut Pichler, Stuttgart (DE)

(73) Assignee: Daimler AG, Stuttgart (DE)

( * ) Notice: Subject to any disclaimer, the term of this patent is extended or adjusted under 35 U.S.C. 154(b) by 79 days.

(21) Appl. No.: 11/649,353

(22) Filed: Jan. 3, 2007

(65) Prior Publication Data

US 2007/0125695 A1    Jun. 7, 2007

Related U.S. Application Data

(63) Continuation-in-part of application No. PCT/EP2005/006663, filed on Jun. 21, 2005.

(30) Foreign Application Priority Data

Jul. 3, 2004    (DE) .................... 10 2004 032 251

(51) Int. Cl.
    *B01D 35/027*    (2006.01)
    *C02F 1/40*    (2006.01)
(52) U.S. Cl. .................. 210/259; 210/416.4; 210/532.1
(58) Field of Classification Search .................. 210/97, 210/109, 167.04, 252, 259, 416.1, 416.4, 210/416.5, 436, 513, 532.1
See application file for complete search history.

(56) References Cited

U.S. PATENT DOCUMENTS

| 3,929,641 | A |   | 12/1975 | Dukek |
| 3,948,768 | A | * | 4/1976 | Chapman .................... 516/136 |
| 4,579,653 | A |   | 4/1986 | Davis |
| 4,892,667 | A | * | 1/1990 | Parker et al. ................. 210/799 |
| 5,225,073 | A | * | 7/1993 | Billiet et al. ................. 210/121 |
| 6,066,264 | A | * | 5/2000 | Ronan et al. ................. 210/776 |
| 6,773,605 | B2 | * | 8/2004 | Nyborg et al. ............... 210/741 |

FOREIGN PATENT DOCUMENTS

| CA | 963400 |   | 2/1975 |
| DE | 31 45 964 A1 |   | 5/1990 |
| DE | 44 31 496 A1 |   | 3/1998 |
| EP | 0 362 114 B1 |   | 8/1992 |
| EP | 0 732 133 A1 |   | 9/1996 |
| GB | 903505 |   | 8/1962 |
| GB | 2251812 | * | 7/1992 |

* cited by examiner

*Primary Examiner*—Fred G. Prince
(74) *Attorney, Agent, or Firm*—Klaus J. Bach

(57) ABSTRACT

In a device for separating water and filtering impurities out of liquid hydrocarbons or fuels, comprising a housing including a first vertically arranged hollow body receiving the coalescer element and a second vertically arranged hollow body receiving a fine filter, and the first and second hollow bodies are joined to one another via a flow-routing component, both being oriented perpendicularly to the horizontally arranged flow-routing component which has a relatively large volume and a configuration for quieting the fuel flow to enhance collection of water droplets in a collection chamber formed at the bottom of at the bottom of the flow-routing component from where the collected water can be discharged.

14 Claims, 2 Drawing Sheets

DEVICE FOR SEPARATING WATER AND FILTERING IMPURITIES OUT OF FUEL

This is a Continuation-In-Part Application of International Application PCT/EP2005/006663 filed Jun. 21, 2005 and claiming the priority of German Application 10 2004 032 25.1 filed Jul. 3, 2004.

BACKGROUND OF THE INVENTION

The invention relates to a device for separating water and for filtering impurities out of fuel, to a fuel supply system including such a filtering device and to a Diesel engine with common rail fuel injection and a fuel supply system including the filtering device.

In internal combustion engines with fuel injection, water intermixed to a greater or lesser extent with the fuel causes damage to structural parts which may result in the failure of fuel injection components.

The free water contained in the fuel results from
  water which is dissolved in the fuel and is separated as a function of temperature;
  condensation water which is released from the air during the cooling phase after the engine has been stopped, the air originally having flowed into the fuel tank via the tank venting valve for the compensation of fuel consumption;
  refueling, during which water is in most instances inadvertently introduced.

Manufacturers of "common-rail injection systems" are meanwhile required to have a separation rate of >95% for the free water contained in the fuel. This places stringent requirements on the efficiency of such water separation system.

DE 31 45 964 A1 discloses a device for separating water and for filtering impurities out of liquid hydrocarbons. A filter/water separator include filter and coalescer elements which are arranged horizontally in a housing and through which the flow passes from the inside outwardly, and separation elements, through which the flow passes from the outside inwardly. The separation elements have arranged inside them coaxially in each case a hollow cylinder which extends with its one end into the outlet end and, at its other end, has an inflow port. The hollow cylinder is provided with lateral inlet ports which are distributed over its length and the overall cross section of which increases toward the outlet. The flow impinges on the separation elements obliquely; a flow component directed toward an end-face calming zone transports separated water drops toward the calming zone where the water drops fall into a water collection sump.

In versions of this kind, water separation normally takes place on the suction side of the fuel feed pump. The water separator is therefore arranged between the tank and the fuel feed pump. The water admixed with the fuel is present in relatively large drops, this constituting a precondition for this type of water separation. Water separation takes place, in the first step, during passage through a horizontally arranged coalescer element. In order to achieve guaranteed water separation, a likewise horizontally arranged cylindrical separation element is provided, which, in addition to the functionally necessary mesh width, has an impregnated hydrophobic outer surface which has an inhibiting effect on the passage of water. During operation, the small water drops are combined in the coalescer element into larger drops. When the water drops flow further on, they sink downward, offset at 90° to the fuel flow, due to their greater weight. Small and therefore light water drops are entrained and are caught on the surface of the separation element, that is to say they are held in contact with the separation element by the fuel flowing through the separation element and, under certain circumstances, are pressed through the separation element. This effect is to be reduced by means of a modified hollow cylinder which is provided in the separation element and is in the form of bores which are increased in cross section toward the outlet side.

A similar device is normally employed nowadays in vehicles with internal combustion engines. The separation element used here is modified in that the outer surface must have hydrophobic properties. Due to the higher fraction of impurities in the fuel, however, the hydrophobic properties are greatly reduced because of the increasing dirt load. This leads to an impairment in the separation behavior of water. Furthermore, basically, the through-flow resistance rises over the period of use on account of the increasing dirt load. This has a direct lessening effect on the delivery capacity of the low-pressure fuel feed pump and therefore on the fuel supply for the injection system of the engine. A version of this type basically has higher system sensitivity. Sometimes, this can be compensated for by a correspondingly larger design of the fuel feed pump, but this entails extra cost. Furthermore, above all, the effectiveness of water separation decreases rapidly with the increasing dirt load. This results in a markedly-reduced useful life, that is to say, in shorter service intervals, and therefore in an increase in operating costs. Enlarging the filter surface in order to compensate for this disadvantage requires a larger construction space, thus leading, in turn, to a rise in cost of the system.

It is also a disadvantage that the separated water which has dropped into the water collection space arranged underneath the water separator can be discharged manually only when the engine is at a standstill. For this purpose, discharge requires an airflow (ventilation) into the water separator. This then has to be de-aerated again by means of a hand-operated feed pump or the like and a manually actuated vent screw, in order to restore the satisfactory functioning of the injection system. Here, automation would require, as an additional disadvantage, the installation of a further pump.

GB 903 505 A, U.S. Pat. No. 4,579,652 and EP-A-0 732 133 in each case disclose a filter of two-stage construction with two separate vertically arranged filter chambers for separating water and particles from fuels. In each case the first filter chambers contain elements for coalescer water drops and the second filter chambers contain fine filters for particle separation. The filter chambers are connected to one another by means of a horizontally extending flow-routing component.

It is the object of the present invention to provide a device for separating water and for filtering impurities out of liquid hydrocarbons or fuels, whereby the effectiveness of water separation is improved and installation space is optimized at relatively low costs.

SUMMARY OF THE INVENTION

In a device for separating water and filtering impurities out of liquid hydrocarbons or fuels, comprising a housing including a first vertically arranged hollow body receiving the coalescer element and a second vertically arranged hollow body receiving a fine filter, and the first and second hollow bodies are joined to one another via a flow-routing component, both being oriented perpendicularly to the horizontally arranged flow-routing component which has a relatively large volume and a configuration for quieting the fuel flow to enhance collection of water droplets in a collection chamber formed at the bottom of at the bottom of the flow-routing component from where the collected water can be discharged. The hydrocarbons mentioned above are preferably engine fuels, such as, for example, gasoline, diesel and other liquid fuels.

In a particular embodiment of the invention, there is a transition area from a small flow cross-section of the first hollow body to a large flow cross-section of the flow-routing component.

Preferably, that portion of the flow-routing component which is located in the jointure area between the connections of the two hollow bodies has a cross section A1 which narrows in the direction toward the second hollow body.

Advantageously, the portion of the flow-routing component has in its upper region a guide structure by which the two hollow bodies are directly interconnected.

In an alternative embodiment, the second hollow body has a narrowing cross-section at its end inclined toward the flow-routing component.

The flow routing component comprises in its lower region, on one side thereof, a valve-controlled device for the discharge of water with a water sensor disposed on the side of the component opposite the valve-controlled device, and at a geodetically higher level than the valve-controlled device.

In a preferred embodiment of the device according to the invention the device includes a coalescer element through which the fuel passes from the inside outwardly.

Preferably, the coalescer element is so arranged that the volume located between the outer face of the coalescer element and the inner face of the first hollow body forms a flow area which is smaller than the cross section of the connection between the first hollow body and the flow-routing component and the flow can pass through the fine filter from the outside inwardly.

The device is advantageously included in a system having a low-pressure fuel feed pump arranged upstream of this device and a pre-filter arranged upstream of the low-pressure fuel feed pump for filtering impurities with the purpose of protecting the fuel feed pump from damage.

The pre-filter may be integrated structurally into the device for separating water and for filtering impurities.

Preferably, water separation takes place on the delivery side of the low-pressure fuel feed pump.

According to a preferred embodiment, the device for separating water and for filtering impurities includes a high-pressure pump arranged downstream of the impurity filter.

The device is particularly usable in an injection system for an internal combustion engine with a common rail fuel injection system including fuel injectors in order to prevent clogging of the sensitive injectors.

Since all the components relevant to fuel treatment, such as the coalescer element, the fine filter and the prefilter, are combined in one structural part, the design of the fuel supply for the injection system of fuel into the cylinders of an internal combustion engine can be optimized advantageously in terms of installation space, operating and manufacturing costs. Furthermore, because of the various elements for filtering impurities, a rapid dirt accumulation in any particular part of the device according to the invention is avoided, thus resulting in an increase in the efficiency of water and impurities separation and therefore in savings of maintenance costs because of longer service intervals for the filter elements. Moreover, a more cost-effective low-pressure fuel feed pump designed according to particular requirements can be provided.

The invention will be described below in detail with reference to the accompanying drawings in which particular embodiments are shown in a diagrammatically highly simplifying way:

DESCRIPTION OF PREFERRED EMBODIMENTS

Figure 1:
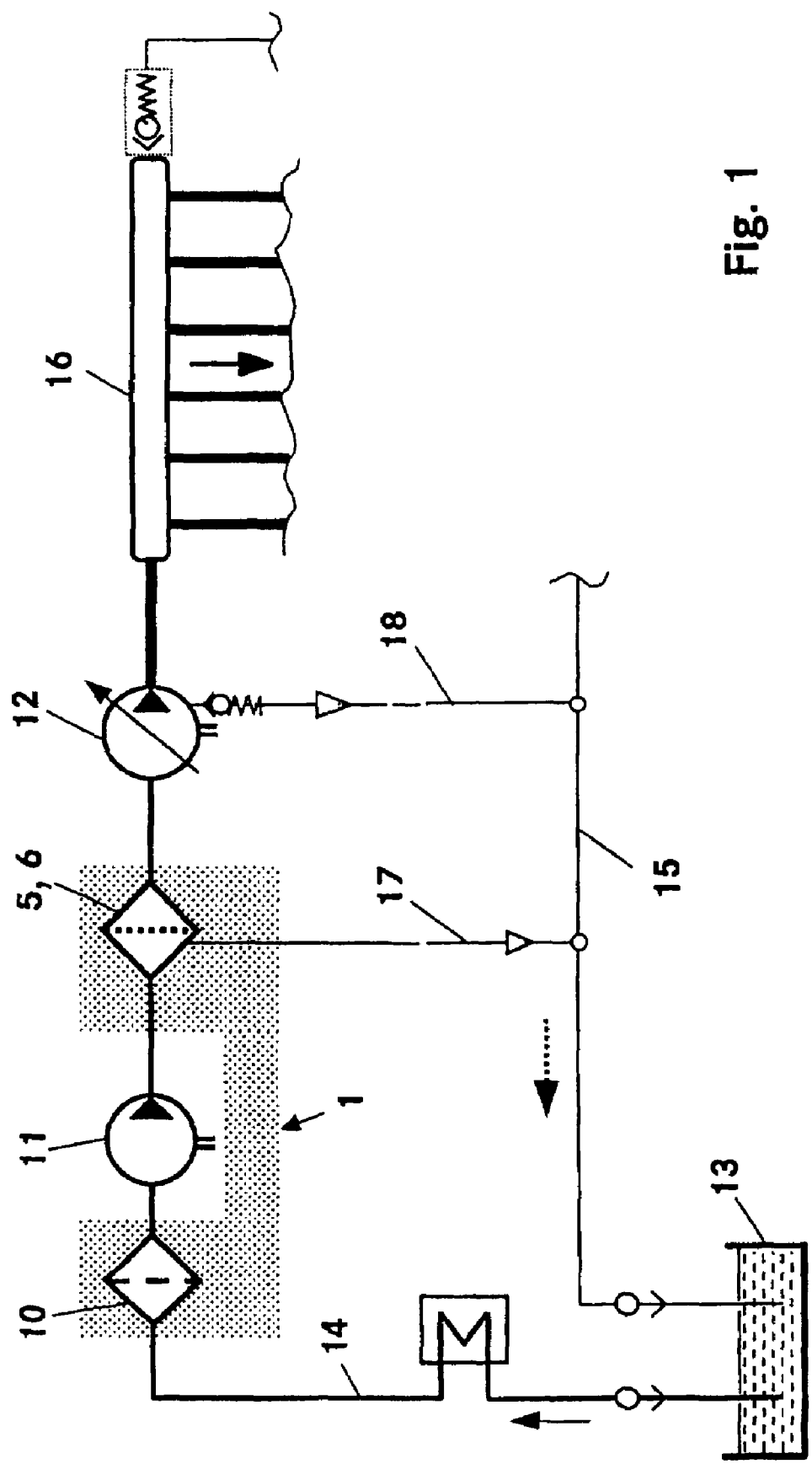
FIG. 1 shows a preferred arrangement of the device according to the invention in a fuel system.

As illustrated in FIG. 1, a low-pressure fuel feed pump 11 sucks in the fuel out of the fuel tank 13 through a prefilter 10. The object of the pre-filter 10 is to filter impurities out of the fuel, in order to protect the low-pressure fuel feed pump from damage. As illustrated in the drawing, the pre-filter 10 may be integrated into the housing 1 of the device for separating water and filtering impurities.

From the delivery side of the low-pressure fuel feed pump 11, the fuel is transferred into a coalescer element 5. In this element 5, the very small water droplets are combined into larger ones. In principle, large water drops are formed upon passage of the fuel through the element 5. To protect the coalescer element 5 from impurities, a filter (not shown) may additionally be arranged within the element 5 at the fuel/water mixture inlet side. The fuel passes from there directly via a flow-routing component (not illustrated separately) into a fine filter 6. This filter 6 is adapted to virtually completely filter out any impurities, even those which have passed through the coalescer element 5. The components in the high-pressure pump 12 and in the injectors which have very small plays are thus advantageously protected from damage caused by water and impurities.

The fuel from which the water and impurities have been removed leaves the fine filter 6 in the direction toward the high-pressure pump 12. From there, the rail 16 and consequently the injectors, not illustrated, are supplied with fuel according to the pressure requirement. Excess fuel can be recirculated into the fuel tank 13 via a line 18 which branches off from the high-pressure pump 12 and which leads to a recirculation line 15. Venting, not illustrated, which is integrated into the device for separating water and filtering impurities, is recirculated into the tank or deaerated via a line 17 which branches off from this device and which likewise leads to the recirculation line 15.

Figure 2:
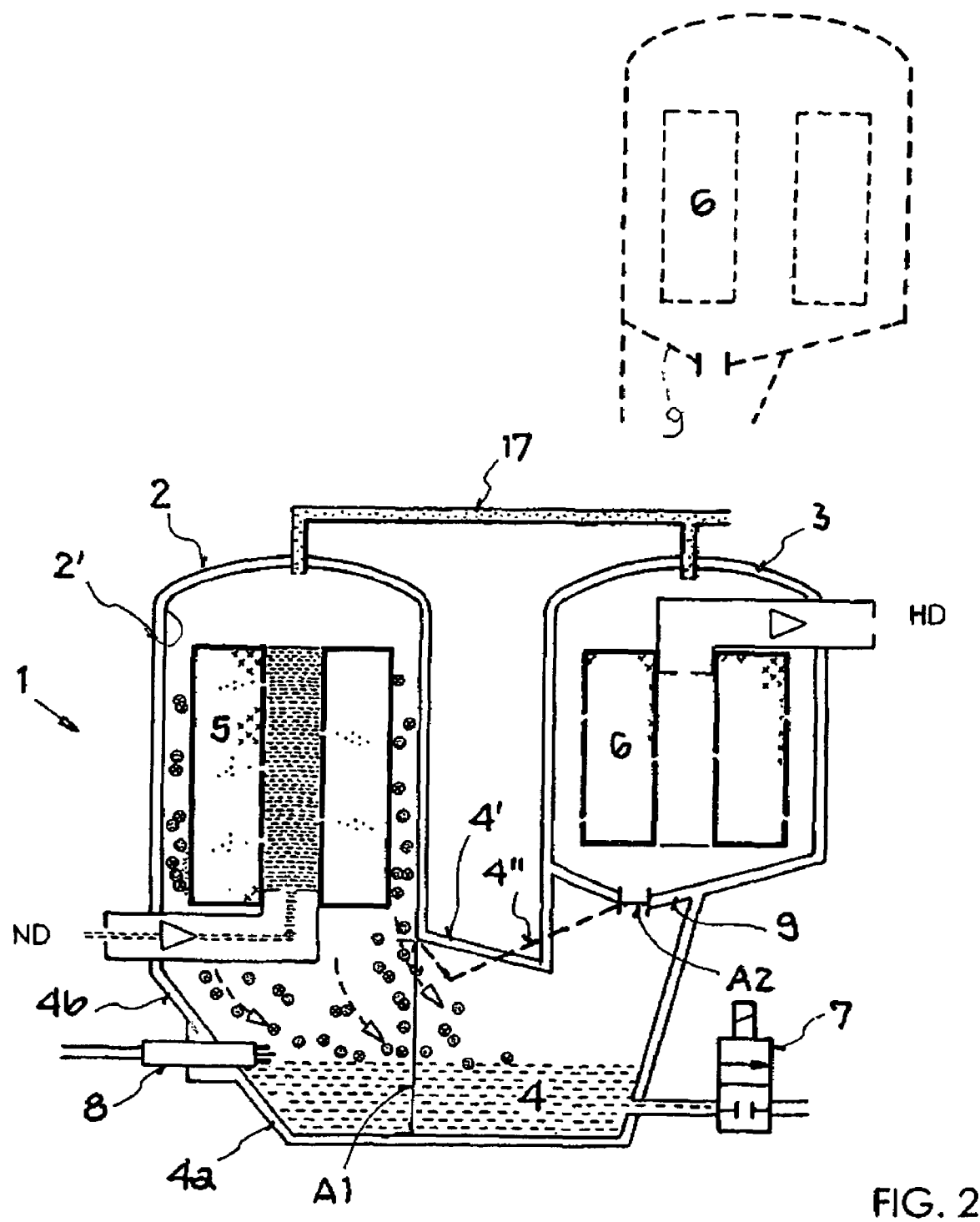
FIG. 2 shows a preferred embodiment of the device according to the invention.

The device according to the arrangement as shown in FIG. 2 for separating water and for filtering impurities out of liquid hydrocarbons or fuels comprises two separate hollow bodies 2, 3 which are connected to one another via a flow-conducting component 4. The hollow body 2 includes the coalescer element 5 for separating water, and the hollow body 3 includes a fine filter 6 for separating impurities. Both hollow bodies 2, 3 are preferably cylindrical and are arranged essentially parallel and next to one another and have vertical axes, the coalescer element 5 being located in the hollow body 2 and the fine filter 6 being located in the hollow body 3 are oriented perpendicularly to the horizontally arranged flow-conducting component 4. Moreover, both hollow bodies are connected to one another via a common venting line 17. The lower part of the flow-routing component 4 is designed for receiving the separated water and comprises in its lower region, on one side, a valve-controlled device 7 for the discharge of water and, on that side of the component 4 which faces away from the valve-controlled device 7, a water level sensor 8 which is arranged at a geodetically higher level than the valve-controlled device 7.

According to the invention, the fuel sucked in from the fuel tank (not illustrated) by the low-pressure fuel feed pump (ND), not shown, passes on the delivery side into the device for separating water and for filtering impurities out of liquid hydrocarbons or fuels. In this case, the water is mixed in very small droplets with the fuel due to the pumping action of the low-pressure fuel feed pump (ND). In this way, an emulsion is formed, which is pumped by the low-pressure fuel feed pump into the interior of the coalescer element 5 and is broken by the latter during passage from the inside outward. The coalescer element 5 used here, for example, manufactured by the company Racor, has the property that the very small water droplets, when they pass through, are first caught in the element 5 and, due to the continuous accretion of further droplets, grow or are combined into larger drops. The large water drops generated in this way are likewise entrained by the fuel flowing through the element 5, the direction of flow being the same both for the fuel and for the water drops. By means of a filter, not illustrated, additionally arranged in the element 5 on the inlet side of the fuel/water mixture, impurities, preferably in the form of solid particles, can at the same time also be filtered out.

Because of the small gap between the outer circumference of the coalescer element 5 and the inside 2' of the first hollow body 2, only a small flow cross section is available to the out-flowing mixture of fuel and water drops, so that a relatively high flow velocity is achieved.

An important precondition for water separation is, on the one hand, that the flow of the fuel together with the incorporated water drops is appropriately delayed, that is to say "calmed", on the path further on to the fine filter and, on the other hand, that the flow routing is predetermined structurally by the water collection component 4. This is achieved by the particular design according to the invention of the device for separating water and filtering impurities. A calming, that is to say deceleration, of the flow can be achieved by the transition from a small annular cross section of the hollow body 2, due to the preferred cylindrical design of the hollow bodies 2, 3, into a large flow cross section of the component 4. This calming zone is distinguished by a greatly reduced flow speed. Since the water drops have a higher specific density than the liquid fuel in which the water drops are entrained, these sink onto the bottom of the component 4, particularly due to the low velocity, or, when they flow through, are retained on the surface of the water already present. The latter instance is assisted in that the direction of flow in the portion which connects the two hollow bodies 2, 3 to one another is also influenced particularly by its guide structure 4' according to the invention. The guide structure 4' shown here may also be configured differently. That portion 4' of the flow-routing component 4 which joins the two hollow bodies 2, 3 may, for example, have a U-shaped profile or, as illustrated in FIG. 2, assume a profile as shown by the dashed line 4", while further contours suitable for flow routing may likewise be envisaged. Furthermore, the flow-routing component 4 may likewise have a U-shaped design in its lower region, here, too, further contours suitable for guiding the flow being conceivable.

The lighter fuel itself continues to flow in the direction of the fine filter 6. What is critical for the separation of the remaining water out of the fuel is in this case, on the one hand, that that portion 4' of the flow-routing component 4 which is located between the connections of the two hollow bodies 2, 3 has a cross section A1 which narrows in the direction toward the second hollow body 3. What is critical, on the other hand, is that the connection of the second hollow body 3 to the flow-routing component 4 has a narrowing configuration 9 and includes a passage A2 which is smaller than the cross section A1. This successive narrowing, following the calming zone, of the flow cross section A2 in the further transport path of the fuel to the fine filter 6 again ensures an increase in the flow velocity. An intensified separation of the water drops still incorporated in the fuel is thereby achieved, since the heavier water droplets not only, but preferably sink out of the lighter fuel in the calming zone because of their higher density, but also, along the further flow, because of their higher mass inertia, they can follow the increasingly more rapid flow only with greater difficulty than the lighter fuel. The result of this is that virtually no water drops are incorporated any longer in the fuel which passes through the narrow passage A2 at the inlet to the fine filter 6. In order to enhance separation in this region even more, the fine filter 6 may be raised to a geodetically still higher different level, as illustrated in FIG. 2 by the fine filter 6 de shown in dashed lines. The result of this is that water drops possibly still present because of their higher weight preferably sink along the long path from the flow-routing component 4 as far as the narrow area 9 of the fine filter 6 disposed at a higher level, thus leading to an intensification of separation. Moreover, in the portion from the flow-routing component 4 as far as the fine filter 6, a structure, for example in the manner of a spiral, may also be arranged, by means of which the water drops possibly still present during the rise of the fuel to the fine filter 6 are driven outward due to the rotational movement induced by the structure (centrifugal effect), in order to sink down along the housing wall. The flow passes through the fine filter 6 from the outside inward. Furthermore, to separate water droplets possibly still present, the fine filter 6 may be designed on its outer surface also with a water-repelling, hydrophobic, but fuel-permeable layer. The fine filter 6 serves mainly for filtering the impurities still present at this time in the fuel. This very fine filtration arranged downstream of water separation protects against damage to, or a malfunctioning of, the components which are installed with very small plays in the high-pressure pump (HD) and those installed in the injectors. The water separation rate of the device according to the invention advantageously amounts to almost 100%. The fuel thus freed of water and impurities leaves the filter 6 in the direction of the high-pressure pump (HD), not illustrated separately. The rail, not shown here, is supplied with fuel according to the pressure requirement by the high-pressure pump (HD).

The water intercepted in the lower part of the component 4 can be discharged either via a manually actuated tap or automatically under the control of a solenoid valve during the engine standstill or during the operation of the engine. The latter makes it possible to admix the water into the exhaust tract, for example also via an already present device for fuel injection. Moreover, there is also the possibility of injecting the water via an extra device designed for this purpose into the exhaust gas or into the engine intake air. Both constitute advantageous environmentally friendly disposal procedures. This is possible by the installation of the device according to the invention for separating water and for filtering impurities on the delivery side of the low-pressure fuel feed pump (ND), since the water, like the fuel, is under the system pressure built up by the low-pressure fuel feed pump. A venting of the fuel system after water emptying is advantageously not required, since the water is discharged under excess pressure and therefore no air can penetrate into the system. An additional pump, as outlined in the introduction in the prior art, can thus advantageously likewise be saved. With a discharge during engine standstill, the air which has flowed in is vented automatically into the fuel tank 13 during the next engine start by way of the venting line 17 which is integrated in the module. The activation of the solenoid valve may take place via an engine control apparatus.

What is claimed is:

1. A device for separating water and for filtering impurities out of liquid hydrocarbons or fuels, comprising a housing (1), at least one coalescer element (5) for separating water and one filter element (6) for separating impurities arranged in the housing (1), said housing (1) including a first hollow body (2) for accommodating the coalescer element (5) and a second hollow body (3) accommodating the filter element (6), said hollow bodies (2, 3) being oriented vertically in essentially parallel relationship to one another and joined via a flow-routing component (4), the coalescer element (5) being located in the first hollow body (2) and the filter element (6) being located in the second hollow body (3) above the flow-routing component (4), the flow-routing component (4) having a lower part (4a) forming a water collection area, and being relatively large so as to form a calming zone in which the flow velocity is greatly reduced for calming the flow on its way to the filter element (6) in the flow-routing component (4), the second hollow body (3) having at its end which is inclined toward the flow-routing component (4) a downwardly narrowing cross sectional area (9) with a flow passage (A2).

2. The device as claimed in claim 1, including a transition from a small cross section of the first hollow body (2) to a large flow cross-section of the flow-routing component (4).

3. The device as claimed in claim 2, wherein a portion of the flow-routing component (4) which is located in a connecting area between the two hollow bodies (2, 3) has a cross section (A1) which narrows in the direction toward the second hollow body (3).

4. The device as claimed in claim 3, wherein a portion of the flow-routing component (4) has in its upper part (4b) a flow guide structure (4') which joins the two hollow bodies (2, 3).

5. The device as claimed in claim 2, wherein the flow routing component (4) comprises in its lower region (4a), on one side, a valve-controlled device (7) for the discharge of water.

6. The device as claimed in claim 5, wherein the flow routing component (4) has in its lower region, on the side disposed opposite the valve-controlled device (7), a water level sensor (8) lying at a geodetically higher level than the valve-controlled device (7).

7. The device as claimed in claim 1, wherein the cross section (A1) of the flow guide structure is larger than the cross section of the flow passage (A2) of the narrowing cross-sectional area (9).

8. The device as claimed in claim 1, wherein the flow pattern in the first hollow body (2) is such that the fuel passes through the coalescer element (5) from the inside outwardly.

9. The device as claimed in claim 8, wherein the volume located between the outer face of the coalescer element (5) and an inner face (2') of the first hollow body (2) has a flow area which is smaller than the cross-section of the connection of the first hollow body (2) to the flow-routing component (4).

10. The device as claimed in claim 1, wherein the second hollow body (3) has a flow pattern which is such that the flow passes through the fine filter (6) from the outside inwardly.

11. A fuel supply system, with a device as claimed in claim 1, comprising a fuel feed pump (11) preceding this device and a pre-filter (10), preceding the fuel feed pump (11), for filtering impurities.

12. The fuel supply system as claimed in claim 11, wherein the pre-filter (10) is integrated structurally into the device for separating water and filtering impurities.

13. The fuel supply system as claimed in claim 11, wherein water separation takes place on the delivery side of the fuel feed pump (11).

14. The fuel supply system as claimed in claim 11, wherein a pump (12) generating a pressure greater than that generated by the fuel feed pump (11) is disposed upstream of the device for separating water and for filtering impurities.

* * * * *